(12) United States Patent
Appleyard et al.

(10) Patent No.: US 10,831,275 B2
(45) Date of Patent: *Nov. 10, 2020

(54) SIMULATING OBSTRUCTION IN A VIRTUAL ENVIRONMENT

(71) Applicant: International Business Machines Corporation, Armonk, NY (US)

(72) Inventors: Thomas D. F. Appleyard, Dibden Purlieu (GB); Gibson Fahnestock, Romsey (GB); Perry A. Harwood, Hampshire (GB); Alexandra E. Wishart, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 320 days.

This patent is subject to a terminal disclaimer.

(21) Appl. No.: 16/028,938

(22) Filed: Jul. 6, 2018

(65) Prior Publication Data

US 2018/0314334 A1 Nov. 1, 2018

Related U.S. Application Data

(63) Continuation of application No. 15/403,625, filed on Jan. 11, 2017, now Pat. No. 10,055,022.

(51) Int. Cl.
G06F 3/01 (2006.01)

(52) U.S. Cl.
CPC .............. *G06F 3/016* (2013.01); *G06F 3/011* (2013.01); *G06F 3/014* (2013.01)

(58) Field of Classification Search
CPC .......... G06F 3/016; G06F 3/014; G06F 3/011
See application file for complete search history.

(56) References Cited

U.S. PATENT DOCUMENTS

| 5,945,978 A | 8/1999 | Holmes |
| 6,275,213 B1 | 8/2001 | Tremblay et al. |
| 6,421,048 B1 | 7/2002 | Shih et al. |
| 6,870,526 B2 | 3/2005 | Zngf et al. |
| 7,390,157 B2 | 6/2008 | Kramer |
| 7,495,654 B2 | 2/2009 | Khoshnevis |
| 7,724,244 B2 | 5/2010 | Nam et al. |
| 8,368,641 B2 | 2/2013 | Tremblay et al. |
| 9,298,259 B2 | 3/2016 | Wiertlewski et al. |

(Continued)

OTHER PUBLICATIONS

Walpole, Jennifer, "VR Glove lets you feel what your're seeing virtually", The American Genius, Mar. 15, 2016, 14 pgs.

(Continued)

*Primary Examiner* — Antonio Xavier
(74) *Attorney, Agent, or Firm* — William H. Hartwell; Madeline F. Schiesser; Keohane & D'Alessandro, PLLC

(57) ABSTRACT

A hand-wearable haptic interface device for simulating interaction with a virtual object in a Virtual Reality (VR) or Augmented Reality (AR) environment is provided. The hand-wearable haptic interface device can provide improved simulation of an obstruction caused by a virtual object in a virtual or augmented reality environment. The device comprises a joint-movement restrictor adapted to be positioned adjacent a finger joint when the device is worn on a hand of a user. The movement restrictor is adapted to provide different magnitudes of flexion resistance force for resisting flexion of the finger joint based on a flexion resistance control signal.

15 Claims, 4 Drawing Sheets

(56) References Cited

U.S. PATENT DOCUMENTS

| | | | |
|---|---|---|---|
| 2002/0021277 A1* | 2/2002 | Kramer | G06F 3/03543 345/156 |
| 2005/0024331 A1 | 2/2005 | Berkley et al. | |
| 2006/0192465 A1 | 8/2006 | Kombluh et al. | |
| 2014/0225694 A1 | 8/2014 | Sitti et al. | |
| 2014/0375769 A1 | 12/2014 | Algreatly | |
| 2015/0314195 A1 | 11/2015 | Bekri | |
| 2016/0019879 A1 | 1/2016 | Daley et al. | |
| 2016/0147304 A1 | 5/2016 | Lund et al. | |
| 2017/0009036 A1 | 1/2017 | Xie et al. | |
| 2017/0090570 A1 | 3/2017 | Rain et al. | |
| 2017/0160807 A1* | 6/2017 | Keller | G06F 3/014 |
| 2017/0165567 A1 | 6/2017 | Walters | |
| 2017/0176267 A1* | 6/2017 | Keller | G01L 1/146 |
| 2017/0232918 A1 | 8/2017 | Sancricca | |
| 2017/0262056 A1 | 9/2017 | Osman | |
| 2017/0319950 A1 | 11/2017 | Buchanan, IV et al. | |
| 2017/0354517 A1 | 12/2017 | Martin | |

OTHER PUBLICATIONS

Unknown, Virtuix Omni, http://www.virtuix.com/, 2016, 10 pgs.

Moss, Richard, "Hands Omni haptic glove lets gamers fee virtual objects", Apr. 27, 2015, 5 pgs.

Unknown, "Reactive Grip—Touch Feedback for VR & Video Games", https://www.kickstarter.com/projects/tacticalhaptics/reactive-griptm-touch-feedback-for-vr-and-video-ga, Nov. 9, 2013, 17 pgs.

Unknown, "Material turns hard or soft at the touch of a button", Science Daily, Jun. 6, 2011, 4 pgs.

Jin et al., "Strength and Flow Stress", Sciencemag.org, vol. 332, Jun. 3, 2011, 5 pgs.

Lee, Yongkwun et al., "Wearable Haptic Glove Using Micro Hydraulic System for Control of Construction Robot System with VR Environmnet", Proceedings of IEEE International Conference on Multisensor Fusion and Integration for Intelligent Systems, Aug. 20-22, 2008, pp. 638-643.

Mavroidis, Constantinos et al., "Haptic Interfaces Using Electrorheological Fluids" Chapter 19, 2004, 27 pgs.

Zubrycki, Igor et al., "Novel Haptic Device Using Jamming Principle for Providing Kinaesthetic Feedback in Glove-Based Control Interface", J Intell Robot Syst,, Jun. 15, 2016, 74 pgs.

Xavier, Antonio J., U.S. Appl. No. 15/403,625, Notice of Allowance dated Apr. 17, 2018, 39 pgs.

Appendix P, "List of IBM Patents or Patent Applications Treated as Related", Mar. 31, 2020, 2 pages.

* cited by examiner

SIMULATING OBSTRUCTION IN A VIRTUAL ENVIRONMENT

CROSS REFERENCE TO RELATED APPLICATIONS

The present patent document is a continuation of U.S. patent application Ser. No. 15/403,625, filed Jan. 11, 2017, entitled "SIMULATING OBSTRUCTION IN A VIRTUAL ENVIRONMENT", the disclosure of which is incorporated herein by reference.

FIELD OF THE INVENTION

The present invention relates generally to simulating interaction with a virtual object in a virtual reality environment. More particularly, the present invention relates to a haptic interface device for simulating an obstruction caused by a virtual object in a virtual or augmented reality environment.

BACKGROUND

The perceived reality of a Virtual Reality (VR) environment is enhanced by the ability of a user to manipulate virtual objects within the virtual environment using hand motions and gestures. For example, a person may use a virtual tool (e.g., a hand-held controller) to manipulate and/or modify a computerized model or virtual object (e.g., a sports ball) in the virtual environment. One way the person may evaluate and manipulate the virtual object is by touching and feeling the surface of the object by using a virtual tool which the person controls through a haptic (sense of touch) interface device, such as a joystick, stylus, or other physical device. Recent developments in VR systems have therefore focused on the use and improvement of haptic interface devices for simulating interaction with a virtual object in VR environments.

SUMMARY

A hand-wearable haptic interface device for simulating interaction with a virtual object in a Virtual Reality (VR) or Augmented Reality (AR) environment is provided. The hand-wearable haptic interface device can provide improved simulation of an obstruction caused by a virtual object in a virtual or augmented reality environment. The device comprises a joint-movement restrictor adapted to be positioned adjacent a finger joint when the device is worn on a hand of a user. The movement restrictor is adapted to provide different magnitudes of flexion resistance force for resisting flexion of the finger joint based on a flexion resistance control signal.

According to an aspect of the present invention there is provided a hand-wearable haptic interface device. The device comprises a joint-movement restrictor adapted to be positioned adjacent a finger joint when the device is worn on a hand of a user. The movement restrictor is adapted to provide different magnitudes of flexion resistance force for resisting flexion of the finger joint based on a flexion resistance control signal. Also, the joint-movement restrictor comprises a meta-material having a malleability which is adapted to vary based on an electric signal supplied to the meta-material, where the supplied electric signal is based on the flexion resistance control signal.

According to yet another aspect, there is provided a system for simulating interaction with a virtual object in a virtual or augmented reality environment. The system comprises a processor arrangement and a hand-wearable haptic interface device comprising a joint-movement restrictor adapted to be positioned adjacent a finger joint when the device is worn on a hand of a user. The movement restrictor is adapted to provide different magnitudes of flexion resistance force for resisting flexion of the finger joint based on a flexion resistance control signal. Also, the joint-movement restrictor comprises a meta-material having a malleability which is adapted to vary based on an electric signal supplied to the meta-material, where the supplied electric signal is based on the flexion resistance control signal. The processor arrangement is configured to generate the flexion resistance control signal.

According to another aspect of the present invention there is provided a hand-wearable haptic interface device. The device comprises a joint-movement restrictor adapted to be positioned adjacent a finger joint when the device is worn on a hand of a user. The movement restrictor is adapted to provide different magnitudes of flexion resistance force for resisting flexion of the finger joint based on a flexion resistance control signal. Also, the joint-movement restrictor comprises an arrangement of electro-magnets adapted to have a repelling force between the electro-magnets which can vary based on an electric signal supplied to the electro-magnets, where the supplied electric signal is based on the flexion resistance control signal.

According to yet another aspect, there is provided a system for simulating interaction with a virtual object in a virtual or augmented reality environment. The system comprises a processor arrangement and a hand-wearable haptic interface device comprising a joint-movement restrictor adapted to be positioned adjacent a finger joint when the device is worn on a hand of a user. The movement restrictor is adapted to provide different magnitudes of flexion resistance force for resisting flexion of the finger joint based on a flexion resistance control signal. Also, the joint-movement restrictor comprises an arrangement of electro-magnets adapted to have a repelling force between the electro-magnets which can vary based on an electric signal supplied to the electro-magnets, where the supplied electric signal is based on the flexion resistance control signal. The processor arrangement is configured to generate the flexion resistance control signal.

According to still another aspect, there is provided a method for simulating interaction with a virtual object in a virtual or augmented reality environment. The method comprises calculating a resistance that a hand of a user would encounter when interacting with a real-world object corresponding to the virtual object. The method further comprises sensing flexion of a finger joint on the hand of the user and generating a flexion feedback signal indicating the sensed flexion of the finger joint. Further, the method comprises calculating a flexion resistance force based on the calculated real-world resistance and the sensed flexion in response to the flexion feedback signal and generating a flexion resistance control signal indicating the calculated flexion resistance force. Additionally, the method comprises applying, through a hand-wearable haptic interface device, the flexion resistance force to the finger joint to restrict flexion of the finger joint.

BRIEF DESCRIPTION OF THE DRAWINGS

These and other features of this invention will be more readily understood from the following detailed description of the various aspects of the invention taken in conjunction with the accompanying drawings in which.

Figure 1:
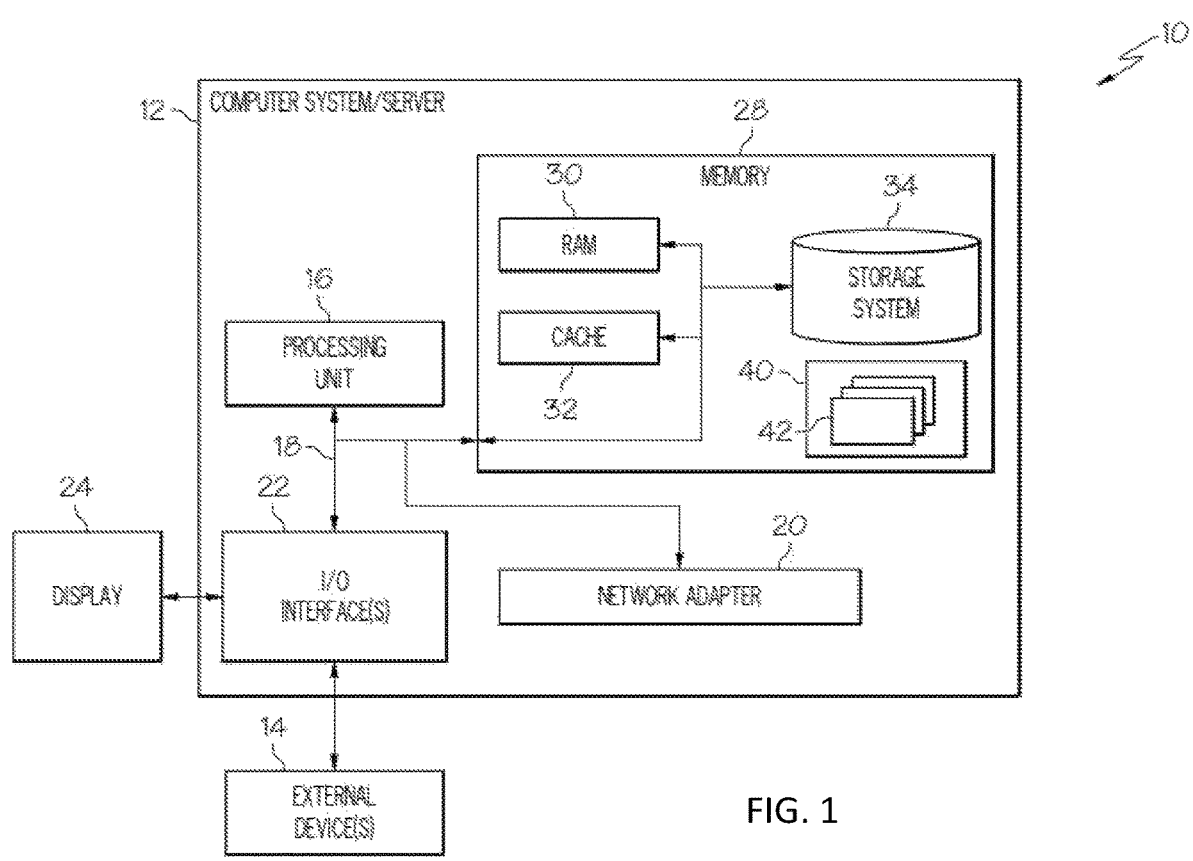
FIG. 1 shows an architecture in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide for a hand-wearable haptic interface device for simulating interaction with a virtual object in a Virtual Reality (VR) or Augmented Reality (AR) environment. The hand-wearable haptic interface device can provide improved simulation of an obstruction caused by a virtual object in a virtual or augmented reality environment. The device comprises a joint-movement restrictor adapted to be positioned adjacent a finger joint when the device is worn on a hand of a user. The movement restrictor is adapted to provide different magnitudes of flexion resistance force for resisting flexion of the finger joint based on a flexion resistance control signal.

Accordingly, embodiments of the present invention may be utilized in a wide range of VR or AR systems and/or applications, including entertainment, design, engineering, and medical fields/applications. The following description provides a context for the description of elements and functionality of embodiments and of how elements of the embodiments may be implemented.

Described herein are devices for providing different levels or magnitudes of flexion resistance force for resisting flexion (e.g., bending movement) of finger joints of a user's hand. By resisting flexion of finger joints of a user's hand, devices described herein can simulate the presence of an object in the user's hand by mimicking the object's resistance to being moved, squeezed, or compressed, for example.

Embodiments of the present invention can therefore provide an interface device which is capable of simulating the resistance felt when holding a solid object. By way of example, by calculating the resistance that the user's hands would encounter when interacting with a 'solid' object in a virtual space and relaying this information to an interface device according to an embodiment, the interface device can be adapted to provide a flexion resistance force (for resisting flexion of finger joints of the user) which restricts finger movement in such a way as to mimic what would occur in real life. For instance, in simulating the presence of a cup in the user's hand, an embodiment may resist finger joint flexion in such a way as to stop the user from closing his/her hand (e.g., bending his/her fingers inwards towards the palm), thereby replicating the cup's resistance to being crushed.

Thus, it may be appreciated that embodiments of the present invention can provide for a device that offers the resistance that a user expects to experience by interacting with an object by hand and simulates such resistance by resisting flexion of the user's finger joint(s).

Illustrative embodiments of the present invention therefore provide systems and methods for resisting flexion of a user's finger joint to simulate an object or obstruction in a user's hand. Further, dynamic and user-specific (e.g., personalized) obstruction simulation is provided by embodiments.

Unlike existing VR interfacing techniques that do not provide for a realistic feeling of interaction with an object in a VR environment (e.g., because a user may pass a hand through the virtual object without any impediment), embodiments of the present invention can provide a resistance to movement or flexion of finger joints which simulates interaction with a VR object in a realistic and convincing manner. Such embodiments may, for example, be employed in VR gloves (e.g., gloves for interfacing with VR technology to control the VR environment and/or deliver haptic feedback to a user) so as to simulate a feeling of holding a solid object. Further, the level of resistance to movement, bending, or flexion of finger joints provided by embodiments can be designed to closely replicate that which would be provided by a real object, thereby enabling simulation of the object's physical properties (such as size, shape, hardness, softness, elasticity, rigidity, stiffness, flexibility, etc.).

Furthermore, modifications and additional approaches to traditional haptic feedback interface devices/systems may become apparent in view of embodiments of the present invention, which may enhance the value and utility of embodiments of the present invention.

Accordingly, embodiments of the present invention are directed toward enabling simulation of an object's physical resistance to being moved or manipulated (e.g., compressed, squashed, pressed, squeezed, etc.) by adapting a hand-wearable device to provide different magnitudes of flexion resistance force for resisting flexion of one or more finger joints of a wearer based on a flexion resistance control signal. Further, the embodiments can enable the shape and/or structure of an object to be simulated by individually controlling the flexion resistance force provided to different fingers joints.

The inventors of the present invention have discovered that meta-materials (having a malleability which can be tuned depending on an electrical signal supplied to it) may be employed to provide a flexion resistance force that can be dynamically controlled and/or varied according to requirements. For instance, by forming a finger sleeve of a glove from such a meta-material and then applying a particular electrical signal to the meta-material, the finger sleeve's malleability (and thus resistance to bending or flexing) can be controlled and thus used to simulate the presence of an object.

Embodiments can thus employ known meta-materials that have a malleability which can vary based on an electrical signal supplied to the meta-material. By way of example, such material has been presented by Jörg Weissmüller and Hai-Jun Jin in an article entitled "A Material with Electrically Tunable Strength and Flow Stress" (Science, 3 Jun. 2011, Vol. 332, Issue 6034, pp. 1179-1182). In particular, Jörg Weissmüller and Hai-Jun Jin present a material (hereinafter the "Weissmüller-Jin material") that has a hybrid nanostructure consisting of a strong metal backbone that is interpenetrated by an electrolyte as the second component. By polarizing the internal interface via an applied electric potential, a fast and repeatable tuning of yield strength, flow stress, and ductility is achieved. Thus, this allows a user to select, for instance, a soft and ductile state and a high-strength state, thereby facilitating the provision of different magnitudes of flexion resistance force based on applied control signal, for example.

The inventors of the present invention have further discovered that an arrangement of electromagnets can be employed to provide a flexion resistance force that may be dynamically controlled and/or varied according to requirements. For instance, a joint-movement restrictor can be implemented using a set of electro-magnets arranged such that magnet sections/portions repel each other under the control of an applied electrical signal (e.g., which alters the arrangement and/or polarity of the magnets). Thus, by applying a particular electrical signal to the electromagnets, the attraction or repulsion force (and thus resistance to bending or flexing) can be controlled and thus used to simulate the presence of an object.

Referring now to FIG. 1, a computerized implementation 10 of an embodiment for simulating an obstruction caused by a virtual object in a virtual or augmented reality environment will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system 12 is intended to demonstrate that some or all of the components of implementation 10 could be deployed, managed, serviced, etc., by a service provider who offers to implement, deploy, and/or perform the functions of the present invention for others.

Computer system 12 is intended to represent any type of computer system that may be implemented in deploying/realizing the teachings recited herein. Computer system 12 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system 12 represents an illustrative system for simulating an obstruction caused by a virtual object in a virtual or augmented reality environment. It should be understood that any other computers implemented under the present invention may have different components/software, but can perform similar functions.

Computer system 12 in computerized implementation 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for simulating an obstruction caused by a virtual object in a virtual or augmented reality environment, which is stored in memory 28, storage system 34, and/or program/utility 40. While executing computer program code, processing unit 16 can read and/or write data to/from memory 28, storage system 34, and program/utility 40.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Some embodiments of the present invention can comprise processing unit 16 adapted to receive a flexion control signal from a control system and to generate the flexion resistance control signal based on the received control signal. In this way, embodiments can be adapted to be controlled by a VR or AR control system. Such a system can include a conventional VR or AR system and the processing unit 16 may then be adapted to interpret control signal(s) in order to generate flexion resistance control signals for modifying the magnitude of flexion resistance force provided by the joint-movement restrictor(s). Embodiments may therefore be employed with and controlled by a VR or AR system so as to provide a more realistic and/or convincing experience for a user.

Some embodiments, which will be discussed in further detail below with reference to FIG. 2 and FIG. 3, can include a joint flexion sensor adapted to determine an angle of flexion of the finger joint and to generate a flexion feedback signal based on the determined angle of flexion of the finger joint. The processing unit 16 can then be adapted to generate the flexion resistance control signal further based on the flexion feedback signal. In this way, flexion of the finger joint(s) may be monitored in order to provide feedback information which can be used, for example, to alter the flexion resistance control signal for improved (e.g., corrected, user-specific, and/or more realistic) flexion resistance force(s).

Also, the flexion feedback control signal can be communicated back to the control system. Information can therefore be fed back to the control system, and such information may be useful, for example, for calibrating the control signals and/or joint-movement restrictors so as to provide more accurate and/or improved object simulation.

In some embodiments, which will be discussed in further detail below with reference to FIG. 2 and FIG. 3, a haptic feedback unit can also be included which is adapted to be positioned adjacent a finger pad or palm when the device is worn on the hand of the user. The haptic feedback unit may apply different magnitudes of tactile force to the finger pad or palm based on a tactile feedback control signal. Thus, in addition to simulating an obstruction or resistance provided by an object, such embodiments can also simulate a contact or touch of the object (e.g., by applying a tactile force to the user's hand). Further improved realism or accuracy of simulation may thus be provided by such embodiments. For the purpose of controlling the haptic feedback unit, embodiments can employ a processing unit (e.g., a microprocessor) which receives a haptic feedback control signal from a control system and then generates the tactile feedback control signal based on the received haptic feedback control signal. In this way, such embodiments can be adapted to be controlled by a VR control system (including, for example, a conventional VR or AR system) and the processing unit 16 can then be adapted to interpret control signal(s) in order to generate tactile feedback control signals for modifying the magnitude of tactile force provided by the joint-movement restrictor(s).

Embodiments can further be provided, which will be discussed in further detail below with reference to FIG. 3, in the form of a glove or other hand-wearable structure. For example, a glove or mitten can be provided with components integrated therein or supported thereon. Alternatively, a support framework can be provided which is adapted to be supported on or by a user's hand and/or forearm.

Embodiments may further enhance object simulation realism in a VR or AR system by replicating an object's resistance or obstruction to movement and/or manipulation. Such replication of resistance or obstruction to movement and/or manipulation can be provided by arranging one or more joint-movement restrictors to be positioned adjacent or proximate a user's finger joint(s) in use. By varying the magnitude of flexion resistance force provided by the joint-movement restrictor(s) in accordance with a control signal, realistic simulation of manipulating an object by hand can be provided, which may extend or improve the capabilities, usefulness, or efficiency of a VR or AR systems.

Figure 2:
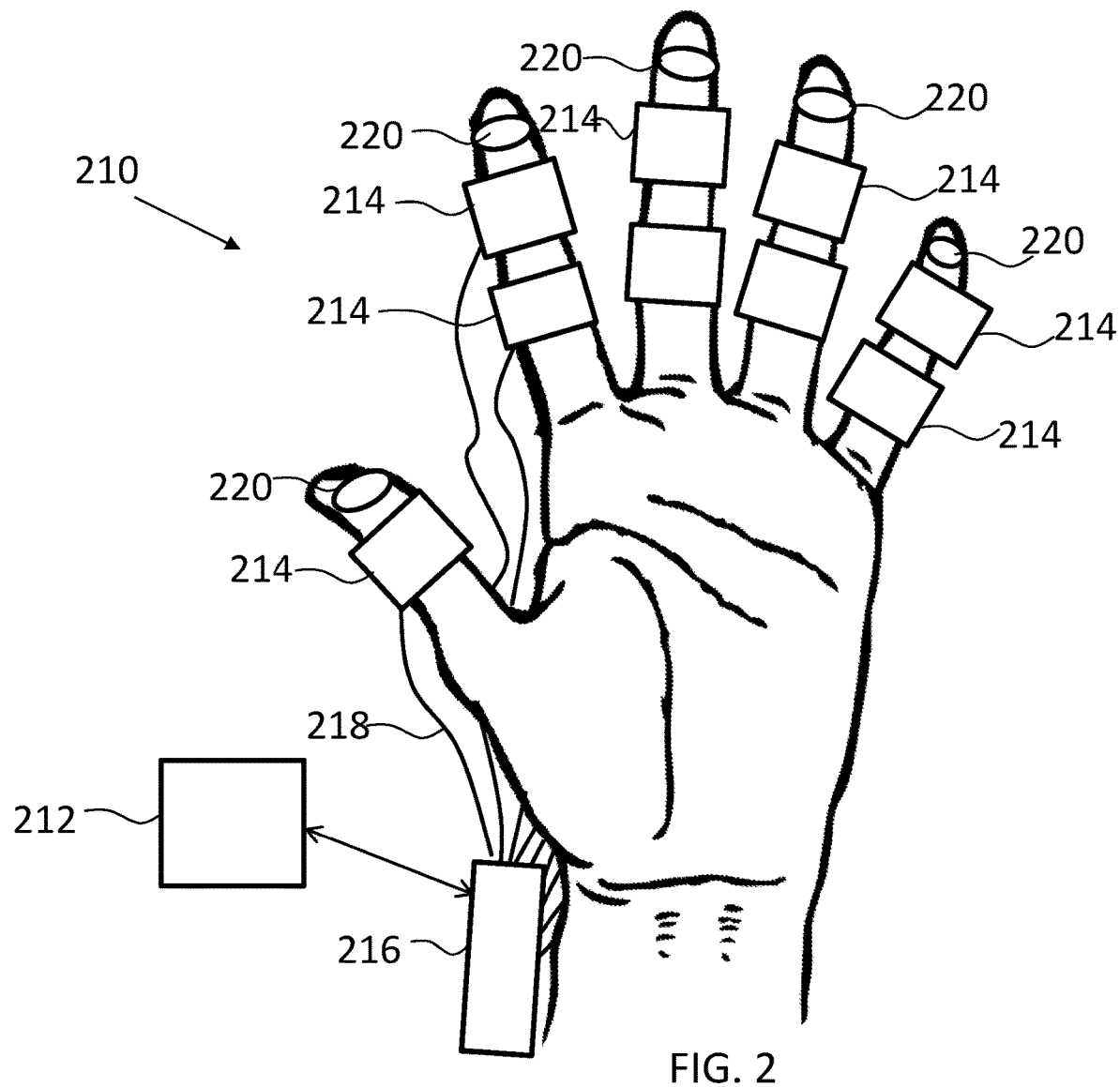
FIG. 2 depicts a pictorial representation of a hand-wearable haptic interface device according to an embodiment.

Turning now to FIG. 2, an exemplary implementation of a hand-wearable haptic interface device according to an embodiment will be described.

Here, the device 210 comprises a plurality of joint-movement restrictors 214 each adapted to be positioned adjacent a respective finger joint of a user when the device 210 is worn on a hand of the user. More specifically, in the depicted embodiment, each joint-movement restrictor 214 comprises a tubular sleeve that is adapted to encircle a respective finger joint. In some embodiments, it may therefore be preferable to adapt the size of each tubular sleeve to be substantially equal or slightly larger (in circumference and length/width) than the respective finger joint it is adapted to receive.

Each of the movement restrictors 214 is adapted to provide varying magnitudes or levels of flexion resistance force for resisting flexion of the respective finger joint based on a flexion resistance control signal. In particular, in this example, each joint-movement restrictor 214 can be formed from a meta-material having a malleability which is adapted to vary based on an electric signal supplied to the meta-material. By way of example only, the meta-material can be the same or similar to the meta-material presented by Jörg Weissmüller and Hai-Jun Jin in an article entitled "A Material with Electrically Tunable Strength and Flow Stress" (Science, 3 Jun. 2011, Vol. 332, Issue 6034, pp. 1179-1182).

Further, the electric signal supplied to each joint-movement restrictor can be based on the flexion resistance control signal. In more detail, the device 210 of FIG. 2 can include a processing unit 216 (e.g., processing unit 16 of FIG. 1) adapted to receive a flexion control signal from a control system 212 (e.g., computer system 12 of FIG. 1) via a wired or wireless communication link. By way of example, wireless connection(s) can comprise a short-to-medium-range communication link.

In this description of embodiments of the present invention, short-to-medium-range communication link should be understood to mean a short-range or medium-range communication link having a range of up to around 100 meters. In short-range communication links designed for very short communication distances, signals typically travel from a few centimeters to several meters, whereas, in medium-range communication links designed for short-to-medium range communication distances, signals typically travel up to 100 meters. Examples of short-range wireless communication links include, but are not limited to: ANT+, Bluetooth, Bluetooth low energy, IEEE 802.15.4, ISA100a, Infrared (IrDA), ISM Band, Near Field Communication (NFC), RFID, 6LoWPAN, UWB, Wireless HART, Wireless HD, Wireless USB, ZigBee. (Ant+ is a registered trademark of Garmin Switzerland GmbH; Bluetooth is a registered trademark of Bluetooth SIG, Inc.; IEEE is a registered trademark of The Institute of Electrical and Electronics Engineers, Inc; IrDA is a registered trademark of Infrared Data Association; ZigBee is a registered trademark of The ZigBee Alliance.) Examples of medium-range communication links include, but are not limited to: Wi-Fi, Z-Wave. (Z-Wave is a registered trademark of Sigma Designs, Corp.) A wired link can, for example, comprise an electrically conductive cable upon which an electrical signal can be communicated using a suitable communication protocol.

Based on the received control signal, the processing unit 216 can generate a flexion resistance control signal (i.e., the electric signal supplied to each joint-movement restrictor) for each of the joint-movement restrictors 214. The flexion resistance control signals can then be communicated to the joint-movement restrictors via wired electrical connections 218 (e.g., bus 18 of FIG. 1). It will, however, be appreciated that the flexion resistance control signals can, in other embodiments, be communicated to the joint-movement restrictors 214 via one or more wireless connections.

In some embodiments of the present invention, as shown in FIG. 2, the device 210 can also include a plurality of haptic feedback units 220. Each haptic feedback unit 220 can be adapted to be positioned adjacent (e.g., close to or touching) a respective finger pad or palm portion of the user's hand when the device 210 is worn on the hand of the user. Each haptic feedback unit 220 can apply different magnitudes or levels of tactile force to the respective finger pad or palm portion based on a tactile feedback control signal. For example, a haptic feedback unit 220 can be adapted to vibrate, move, or expand/contract so as to exert a tactile force on a respective portion of the user's hand or fingers. The magnitude of the tactile force can thus communicate a stimulus to the respective part(s) of the user's hand in a manner which simulates touch of (or contact with) a simulated object.

In the example shown in FIG. 2, the processing unit 216 can receive a haptic feedback control signal from the control system 212. Based on the received control signal, the processing unit 216 can generate the tactile feedback control signal(s) for each of the haptic feedback units 220. The tactile feedback control signals can then be communicated to the haptic feedback units 220 via wired or wireless connections. Based on the tactile feedback control signals, the haptic feedback units 220 can apply different magnitudes of tactile force to the finger pads or palm portion. Thus, in addition to simulating an obstruction or resistance provided by an object, the embodiment of FIG. 2 can also simulate a contact or touch of the object (e.g., by applying a tactile force to the user's hand).

Figure 3:
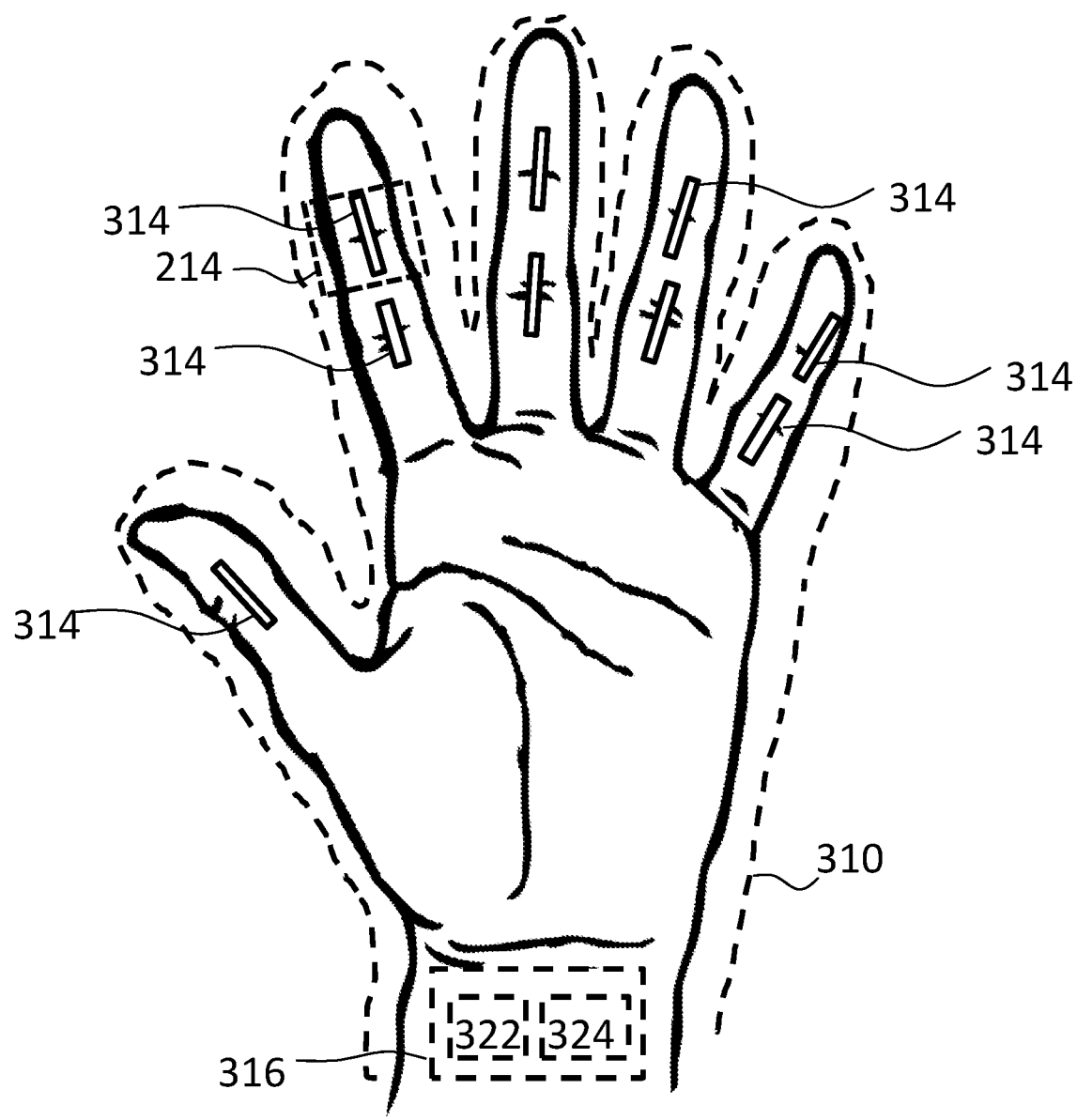
FIG. 3 depicts a pictorial representation of a hand-wearable haptic interface device according to another embodiment.

Referring now to FIG. 3, another embodiment of a hand-wearable haptic interface device will be described. In particular, the embodiment depicted in FIG. 3 is provided in the form of a glove device 310 with components integrated therein or supported thereon.

Here, the device 310 comprises a plurality of joint-movement restrictors 214 (shown in FIG. 2) each adapted to be positioned adjacent a respective finger joint of a user when the device 310 is worn on a hand of the user. More specifically, in the depicted embodiment, each joint-movement restrictor 214 comprises an elongated rod 314 that is adapted to extend (e.g., span) across a respective finger joint. In some embodiments, it may therefore be preferable to adapt the longitudinal length of each rod 314 to be greater than 1 cm, but less than or equal to the length of the respective finger it is adapted to be positioned adjacent to.

Each of the movement restrictors 214 and/or the elongated rods 314 is adapted to provide varying magnitudes or levels of flexion resistance force for resisting flexion of the respective finger joint based on a flexion resistance control signal. In particular, in this example, each joint-movement restrictor 214 and/or elongated rod 314 can be formed from a meta-material having a malleability which is adapted to vary based on an electric signal supplied to the meta-material.

The electric signal supplied to each joint-movement restrictor can be based on the flexion resistance control signal. In more detail, the device 310 of FIG. 3 can include a processing unit 316 adapted to receive a flexion control signal from a control system (e.g., control system 212 of FIG. 2) via a wired or wireless communication link. Based on the received control signal, the processing unit 316 can generate a flexion resistance control signal for each of the joint-movement restrictors 214 and/or elongated rods 314. The flexion resistance control signals can then be communicated to the joint-movement restrictors 214 and/or elongated rods 314 via wired electrical connections (not shown). It will, however, be appreciated that the flexion resistance control signals can, in other embodiments, be communicated to the joint-movement restrictors 214 (FIG. 2) via one or more wireless connections.

In some embodiments of the present invention, as shown in FIG. 3, the device 310 can also comprise a joint flexion sensor 324 adapted to determine an angle of flexion of the finger joint(s) and to generate a flexion feedback signal based on the determined angle of flexion of the finger joint(s). The processing unit 316 of FIG. 3 can therefore be further adapted to generate the flexion resistance control signal (discussed above with reference to FIG. 2) further based on the flexion feedback signal generated by the joint flexion sensor 324. In this way, flexion of the finger joint(s) can be monitored in order to provide feedback information which may be used, for example, to alter the flexion resistance control signal for improved (e.g., corrected, user-specific, and/or more realistic) flexion resistance force(s).

Also, the flexion feedback control signal can be communicated back to the control system, such as control system 212 of FIG. 2, using, for example, a communication interface 322 associated with the processing unit 316. Information can therefore be fed back to the control system, and such information may be useful, for example, for calibrating the control signals and/or joint-movement restrictors 214 (FIG. 2) so as to provide more accurate and/or improved object simulation.

Although the embodiments described above have been detailed as employing components that can be formed of a meta-material having a malleability which can be varied based on an electric signal supplied to the meta-material, it is to be understood that other arrangements may be employed so as to provide a flexion resistance force that can be dynamically controlled and/or varied according to requirements. For instance, in some embodiments, a joint-movement restrictor can be implemented using a set of electro-magnets which are arranged such that magnet sections/portions repel each other under the control of an applied electrical signal (e.g., which alters the arrangement and/or polarity of the magnets). In such embodiments, by applying a particular electrical signal to the electromagnets, the attraction or repulsion force (and thus resistance to bending or flexing) can be controlled and thus used to simulate the presence of an object.

Figure 4:
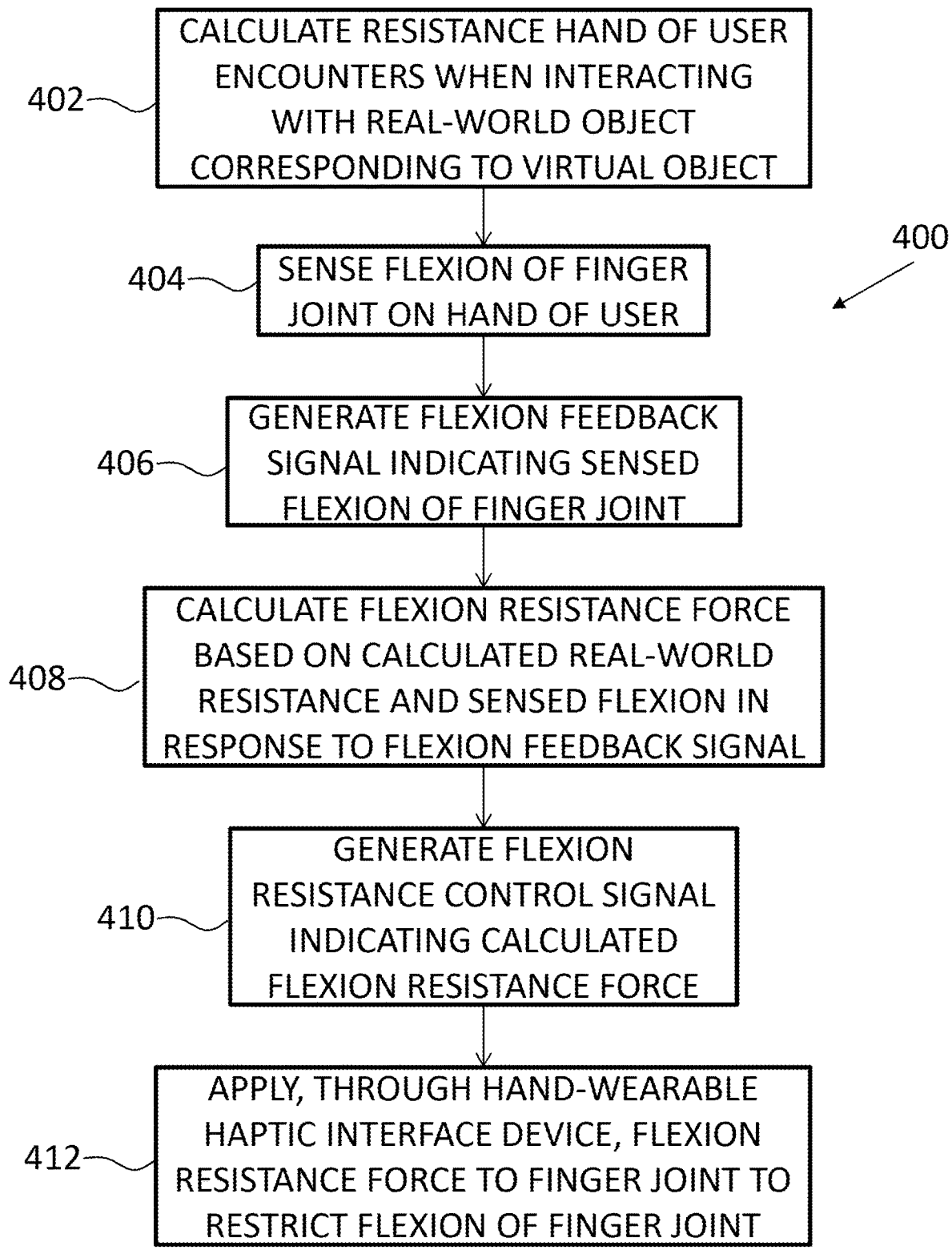
FIG. 4 shows a process flowchart for simulating an obstruction caused by a virtual object in a virtual or augmented reality environment according to illustrative embodiments.

As depicted in FIG. 4, in one embodiment, a system (e.g., computer system 12) carries out the methodologies disclosed herein. Shown is a process flowchart 400 for simulating an obstruction caused by a virtual object in a virtual or augmented reality environment. At 402, a resistance that a hand of a user would encounter when interacting with a real-world object corresponding to the virtual object is calculated. At 404, flexion of a finger joint on the hand of the user is sensed. At 406, a flexion feedback signal is generated indicating the sensed flexion of the finger joint. At 408, a flexion resistance force based on the calculated real-world resistance and the sensed flexion is calculated in response to the flexion feedback signal. At 410, a flexion resistance control signal is generated indicating the calculated flexion resistance force. At 412, the flexion resistance force is applied to the finger joint to restrict flexion of the finger joint through the hand-wearable haptic interface device (e.g., device 210 of FIG. 2 or glove device 310 of FIG. 3).

Process flowchart 400 of FIG. 4 illustrates the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for simulating an obstruction caused by a virtual object in a virtual or augmented reality environment. Thus, embodiments herein disclose a process for supporting computer infrastructure, comprising integrating, hosting, maintaining, and deploying computer-readable code into a computing system (e.g., computer system 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for simulating an obstruction caused by a virtual object in a virtual or augmented reality environment. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is apparent that there has been provided herein approaches to simulate an obstruction caused by a virtual object in a virtual or augmented reality environment. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Therefore, it is to be understood that the appended claims are intended to cover all such modifications and changes that fall within the true spirit of the invention.

What is claimed is:

1. A hand-wearable haptic interface device comprising:
   a joint-movement restrictor adapted to be positioned adjacent a finger joint when the device is worn on a hand of a user, wherein the movement restrictor is adapted to provide different magnitudes of flexion resistance force for resisting flexion of the finger joint based on a flexion resistance control signal; and
   a joint flexion sensor adapted to determine an angle of flexion of the finger joint and to generate a flexion feedback signal based on the determined angle of flexion of the finger joint, wherein the flexion resistance control signal simulates an object's resistance or obstruction to movement or manipulation and wherein the flexion resistance control signal is based on the flexion feedback signal.

2. The device of claim 1, wherein the joint-movement restrictor comprises a meta-material having a malleability which is adapted to vary based on an electric signal supplied to the meta-material, the supplied electric signal being based on the flexion resistance control signal.

3. The device of claim 2, wherein the joint-movement restrictor comprises a tubular sleeve formed from the meta-material and is adapted to receive the finger-joint therein when the device is worn on the hand of the user.

4. The device of claim 1, wherein the joint-movement restrictor comprises one or more rods of meta-material adapted to span across the finger joint when the device is worn on the hand of the user.

5. The device of claim 1, wherein the joint-movement restrictor comprises an arrangement of electro-magnets having a repelling force between the electro-magnets which can vary based on an electric signal supplied to the electro-magnets, the supplied electric signal being based on the flexion resistance control signal.

6. The device of claim 1, further comprising a processing unit adapted to receive a flexion control signal from a control system and to generate the flexion resistance control signal based on the received control signal and on the flexion feedback signal.

7. The device of claim 6, wherein the processing unit is adapted to communicate the flexion feedback control signal to the control system.

8. The device of claim 1, further comprising a haptic feedback unit adapted to be positioned adjacent a finger pad or palm when the device is worn on the hand of the user, wherein the haptic feedback unit is adapted to apply different magnitudes of tactile force to the finger pad or palm based on a tactile feedback control signal.

9. The device of claim 8, further comprising a processing unit adapted to receive a haptic feedback control signal from a control system and to generate the tactile feedback control signal based on the received haptic feedback control signal.

10. The device of claim 1, wherein the device comprises a glove.

11. A system for simulating interaction with a virtual object in a virtual or augmented reality environment, the system comprising:
the hand-wearable haptic interface device of claim 1; and
a control system configured to generate the flexion resistance control signal and to communicate the flexion resistance control signal to the hand-wearable haptic interface device.

12. A computer system for simulating interaction with a virtual object in a virtual or augmented reality environment, the computer system comprising:
a non-transitory memory medium comprising program instructions;
a bus coupled to the non-transitory memory medium; and
a processor, for executing the program instructions, coupled to the bus that when executing the program instructions causes the system to:
calculate a resistance that a hand of a user would encounter when interacting with a real-world object corresponding to the virtual object;
sense an angle of flexion of a finger joint on the hand of the user and generating a flexion feedback signal indicating the sensed angle of flexion of the finger joint;
calculate a flexion resistance force based on the calculated real-world resistance and the sensed angle of flexion in response to the flexion feedback signal and generate a flexion resistance control signal indicating the calculated flexion resistance force; and
apply, through a hand-wearable haptic interface device, the flexion resistance force to the finger joint to restrict flexion of the finger joint.

13. The computer system of claim 12, the instructions further causing the system to:
calculate a magnitude of tactile force that the hand of the user would encounter when interacting with the real-world object corresponding to the virtual object;
generate a tactile feedback control signal based on the calculated magnitude of tactile force; and
apply, through the hand-wearable haptic interface device, the magnitude of tactile force to a finger pad or palm of the hand in response to the tactile feedback control signal.

14. A computer program product for simulating interaction with a virtual object in a virtual or augmented reality environment, the computer program product comprising a non-transitory computer readable hardware storage device, and program instructions stored on the non-transitory computer readable hardware storage device, to:
calculate a resistance that a hand of a user would encounter when interacting with a real-world object corresponding to the virtual object;
sense an angle of flexion of a finger joint on the hand of the user and generating a flexion feedback signal indicating the sensed angle of flexion of the finger joint;
calculate a flexion resistance force based on the calculated real-world resistance and the sensed angle of flexion in response to the flexion feedback signal and generate a flexion resistance control signal indicating the calculated flexion resistance force; and
apply, through a hand-wearable haptic interface device, the flexion resistance force to the finger joint to restrict flexion of the finger joint.

15. The computer program product of claim 14, the non-transitory computer readable storage device further comprising instructions to:
calculate a magnitude of tactile force that the hand of the user would encounter when interacting with the real-world object corresponding to the virtual object;
generate a tactile feedback control signal based on the calculated magnitude of tactile force; and
apply, through the hand-wearable haptic interface device, the magnitude of tactile force to a finger pad or palm of the hand in response to the tactile feedback control signal.

* * * * *